Aug. 7, 1962   R. E. ROBERSON ETAL   3,048,108
SATELLITE STABILIZER

Filed Sept. 7, 1956   2 Sheets-Sheet 1

INVENTOR.
ROBERT E. ROBERSON
BENJAMIN P. MARTIN
BY  KENNETH H. ROGERS

ATTORNEY

3,048,108
SATELLITE STABILIZER

Robert E. Roberson, Fullerton, Kenneth H. Rogers, Long Beach, and Benjamin P. Martin, Pacoima, Calif., assignors to North American Aviation, Inc.
Filed Sept. 7, 1956, Ser. No. 610,878
2 Claims. (Cl. 102—50)

This invention relates to the yaw attitude stabilization of any body travelling in an orbit, for example, a satellite vehicle. More particularly, it pertains to a gyroscopic device which, by proper orientation within a satellite vehicle, adds to the stabilization thereof.

Satellite vehicles can be devised to be inherently stable in their attitudes. A pitch and roll stabilization can be obtained by vertical elongation of the vehicle frame. However, enhancement of yaw stabilization by elongation in the roll direction is quite limited because of the usual requirement of circular cross-sections of the satellite normal to its forward axis during ascent through the atmosphere into the orbit.

The purpose of this invention is to enhance yaw stability when inherent vertical stability exists. The invention consists of a rotating wheel, mounted so that its spin axis lies along a positive pitch axis of the vehicle. The wheel may be run at a constant speed, or, in order to compensate for external pitch-producing torques, the wheel may be operated at varying speeds.

The novelty of this invention is that the device provides a stabilizing torque in yaw (and to some extent in roll) without the sensing of attitude and without the need for determining or computing the vehicle motion and without the expenditure of energy, except that required to overcome motor losses in the flywheel, or gyroscope, which are typical example of a suitable rotating wheel.

At least a part of the function of the flywheel described above can be obtained by the rotating parts already existing in the vehicle. For example, motors, generators, and other rotating equipment, whose angular momentum vector is constant may be aligned parallel to the vehicle pitch axis and serve as the device of the invention.

It is therefore an object of this invention to provide an improved stabilizing element for a satellite vehicle.

It is another object of this invention to provide a gyroscopic stabilizer for a satellite vehicle.

It is still another object of this invention to provide yaw and roll stabilization with a minimum of equipment.

A still further object of this invention is to provide an inherently stable satellite vehicle.

Other objects of invention will become apparent from the following description taken in connection with the accompanying drawings, in which FIG. 1 illustrates a satellite vehicle in an orbital path;

Figure 1:
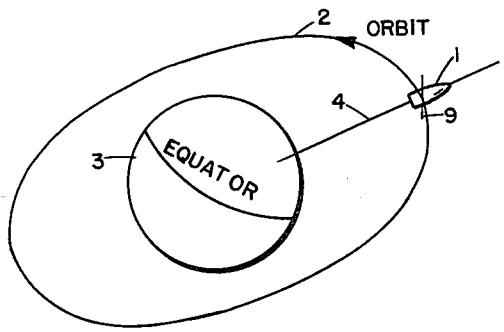

Referring now to FIG. 1, a satellite vehicle 1 in an orbital path 2 moves around earth 3. The local geocentric vertical 4 is drawn from the vehicle to the earth's center of gravity. If the least principal moment of inertia of vehicle 1 lies about line 4, the gravity gradient naturally tends to align vehicle 1 as shown. The vehicle thus rises through the atmosphere nose first and then moves broadside in its orbital path.

Figures 2, 3:
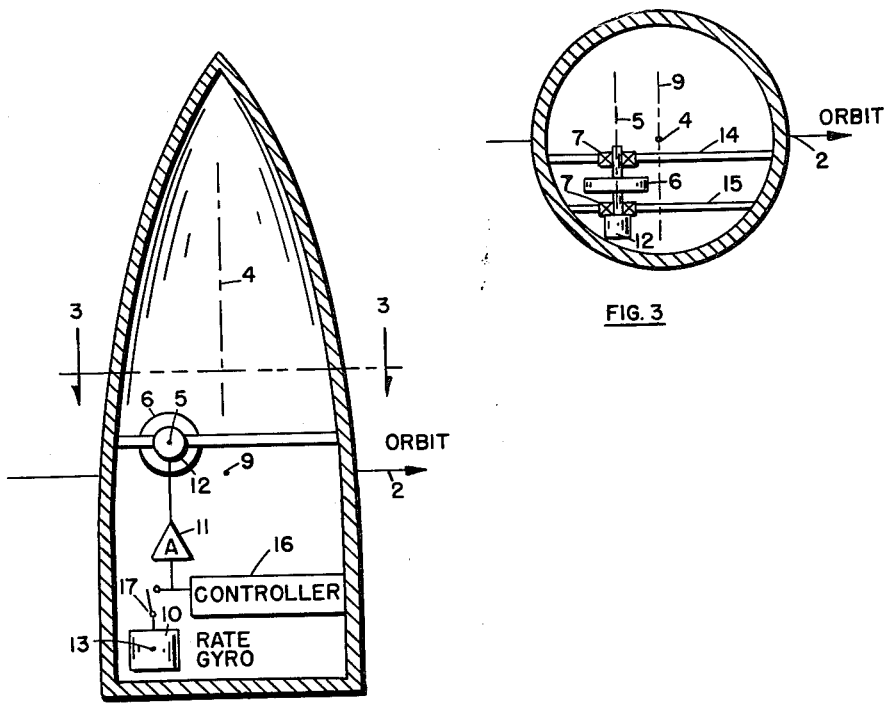
FIG. 2 is a vertical cross section of the vehicle structure.
FIG. 3 is a horizontal cross section of the vehicle.

FIG. 2 illustrates a satellite vehicle, showing its frame in cross-section. The concept of the invention comprises rigidly mounting a spinning wheel 6 with respect to the vehicle frame. The plane of the vertical axis 4 and the orbit path 2 is perpendicular to the spin axis of the wheel. Pitch axis 9 is parallel to the spin axis 5 of the flywheel 6 and may be further located by reference to FIG. 1.

In essence, the plane of rotation of flywheel 6, if initially aligned to the plane of the orbit 2, will act to remain in the plane of orbit 2 and maintain satellite vehicle 1 stabilized to overcome yaw-producing torques. Further, the tendency of flywheel 6 to align its plane of rotation parallel to the orbital plane provides a torque to stabilize the vehicle in roll as well as yaw.

The enhancement of yaw and roll stability can be realized by any wheel which rotates at constant angular velocity relative to the vehicle frame. In the case of disturbing torques acting about the yaw and roll axes, the gyro functions as a direct stabilizer. Thus, under steady-state conditions, a disturbing torque about the yaw axis 4 results in angular precession of the gyro (and the vehicle structure associated therewith) about the roll axis of the vehicle which is substantially the orbital path 2 (see for reference FIG. 2). Such torque, of course, results in a precession velocity about the roll axis (substantially lying along the line indicating orbital path 2) depending upon the gyro rotor moment of inertia, and the gyro rotor spin velocity. A similar disturbing torque about the roll axis which substantially lies along orbital path 2 would result in a similar angular precession of the gyroscope about yaw axis 4. Such precessional affect is well-known to those skilled in the art of gyroscopes. In addition, the same wheel may be used to compensate for pitch perturbation torques if its speed is suitably varied about some steady-state value. The precessional characteristics of a gyroscope, of course, can not stabilize about the third axis (parallel to pitch axis 9); however, the rotor may be used merely as an inertial reaction torque device, and its acceleration or deceleration controlled to obtain stabilization about the pitch axis 9. As the rotor of the gyroscope is increased in speed an opposing reaction force is created against the stator portion of the motor, according to Newton's laws of motion, in an opposite direction. Therefore, when any pitch is detected by rate gyro 13 the speed of the rotating machinery may be increased or reduced in order to counteract such pitch motion. In this case, switch 17 is thrown to connect in a rate gyro 10 whose sensitive axis 13 is mounted to detect any angular velocity about axis 9, the pitch axis, to drive the amplifier 11 which in turn drives the flywheel motor 12, or motors, to cause the wheel to increase or decrease speed, as the case may be, so as to oppose the pitching motion detected by the rate gyro. This is in addition to the constant speed controller 16 which causes the flywheel to have a constant speed in the absence of any rate gyro signal.

FIG. 3 is a view taken on line 3—3 of FIG. 2, showing the flywheel in plan view. The pitch axis 9, the vertical axis 4, and the path 2 are illustrated in their orientation with respect to the flywheel. Struts, such as 14 and 15, fixedly mount the wheel bearings 7 with respect to the body.

As mentioned previously, the effect of the flywheel may be obtained from the rotating machinery already contained within the vehicle, such as motors, generators, gears, pulleys, etc., whose axes of rotation are aligned as illustrated in FIGS. 2 and 3. It is not essential, therefore, that all rotating means be located at the center of the vehicle. It is only essential that the net external angular momentum be perpendicular to the orbital plane. It will be noted that no attitude sensing with respect to earth is required in this system. If compensation obtained by the rate gyro 10 is not desired, pitch stabilization torques may be obtained solely by other means and flywheel 6 is rotated at a constant speed by means of input 16, which may, for example, be simply an input from a D.-C. source; or it may involve feedback from a tachometer or potentiometer driven by the flywheel motor.

Figure 4:
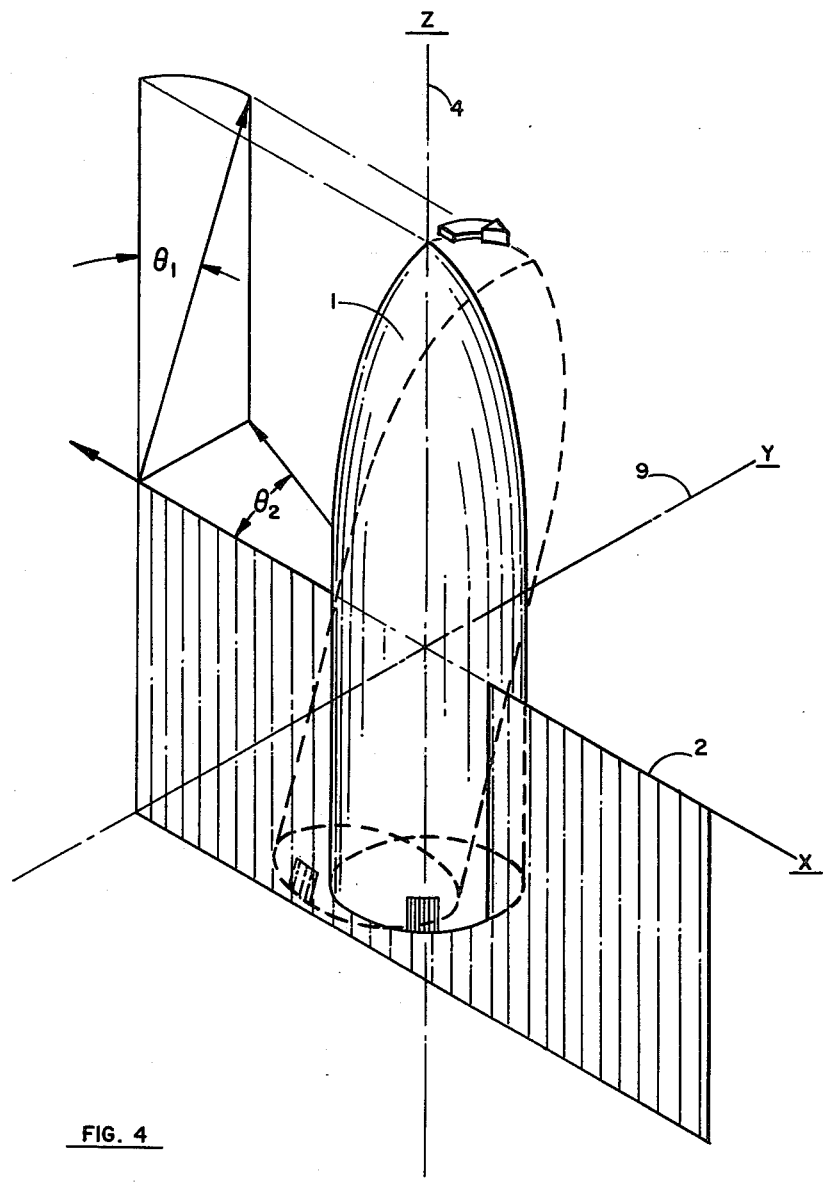
FIG. 4 illustrates a satellite vehicle and its x, y and z axes, together with its roll and yaw angles ($\theta_1$ and $\theta_2$).

FIG. 4 illustrates the satellite in its $x$, $y$, $z$ coordinate system. As can be seen, $\theta_1$ is the angle of roll (about roll axis $x$), and $\theta_2$ is the angle of yaw (about yaw axis $z$).

The attribute of the pitch flywheel which causes it to rotate in the plane of the orbit is observed in the dynamical equations of motion of the vehicle. For the simple case of a circular orbit in an inertially fixed plane, the roll angle, $\theta_1$, measured about an axis lying substantially along orbital path 2, measured from and perpendicular to the orbital plane, and the yaw angle, $\theta_2$, measured about axis 4 from and perpendicular to the orbital plane, satisfy the coupled equations as follows:

$$I_x \ddot{\theta}_1 + [4(I_y - I_z)\omega_0^2 + H\omega_0]\theta_1 + [(I + I_z - I_y)\omega_0 + H]\dot{\theta}_1 = L_x \quad (1)$$

$$I_z \ddot{\theta}_2 + [(I_y - I_x)\omega_0^2 + H\omega_0]\theta_2 - [(I_y + I_x - I_y)\omega_0 + H]\dot{\theta}_1 = L_z \quad (2)$$

where $$I_x, I_y \text{ and } I_z$$

are the principal moments of inertia of the satellite vehicle about its yaw (vertical), pitch and roll (forward) axes, respectively. The "$x$" axis of the satellite vehicle is the forward axis of the vehicle as it proceeds along its orbital path broadside (assuming the vehicle has no yaw angle nor pitch angle). The "$z$" axis is the vertical axis of the satellite, (assuming it has no pitch angle nor roll angle). The "$y$" axis is the lateral axis of the vehicle as it proceeds along its orbital path broadside (assuming the vehicle has no yaw angle nor roll angle). The $x$, $y$ and $z$ axes are orthogonal with respect to each other and are the roll, pitch and yaw axes respectively of the vehicle.

$\omega_0$ is the orbital frequency,

H is the spin angular momentum of the flywheel as seen relative to the vehicle frame, $L_x$ and $L_z$ are the roll and yaw torques acting on the vehicle.

From Equation 2 it can be seen that the term $H\omega_0\theta_2$ corresponds to a yaw restoring torque with a spring constant of $H\omega_0$ in excess of any spring constant $$(I_y - I_x)\omega_0^2$$

which may have been present originally. This yaw restoring torque is added by the device of th invention.

Two other functions are apparent, the term $H\omega_0\theta_2$ may introduce yaw stability into the system where it was not previously present, and the term $H\omega_0\theta_1$ in Equation 1 implies additional roll stability necessarily accompanies increased yaw stability.

Although some yaw stability can be gained by elongation of the vehicle along axis 2, there is a limit, as explained previously, to which this can be done and still maintain the practical missile shape for ascent. The device of this invention implements the yaw stabilization without requiring undue elongation of this dimension.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for stabilizing a satellite vehicle wherein said vehicle orbits around a celestial body in an orbital plane at a speed sufficient to create a centrifugal force substantially equal to the gravitational pull between said vehicle and said celestial body, said stabilizing means including a rotatable wheel attached to said body, the plane of rotation of said wheel being oriented with respect to said body so as to be parallel with said orbital plane of said body, means for controlling the speed of said rotating wheel according to the pitch agular velocity of said body.

2. Means for stabilizing a satellite vehicle wherein said vehicle orbits around a celestial body in an orbital plane at a speed sufficient to create a centrifugal force substantially equal to the gravitational pull between said vehicle and said celestial body, said means including a gyroscope comprising a rotating wheel, a motor for rotating said wheel, a bearing mounting said rotating wheel fixedly with respect to said vehicle except about the rotatable axis of said wheel, a rate gyroscope attached to said vehicle, said motor for rotating said wheel being at least response to the output of said rate gyroscope.

References Cited in the file of this patent

UNITED STATES PATENTS

| | | |
|---|---|---|
| 1,459,198 | Dunajeff | June 19, 1923 |
| 2,555,165 | Turner | May 29, 1951 |

UNITED STATES PATENT OFFICE
CERTIFICATE OF CORRECTION

Patent No. 3,048,108                                        August 7, 1962

Robert E. Roberson et al.

It is hereby certified that error appears in the above numbered patent requiring correction and that the said Letters Patent should read as corrected below.

Column 3, lines 15 to 23, the equations (1) and (2) should appear as shown below instead of as in the patent:

$$I_x \ddot{\theta}_1 + [4(I_y - I_z)\omega_0^2 + H\omega_0]\theta_1$$

$$+ [(I_{\underline{x}} + I_z - I_y)\omega_0 + H]\dot{\theta}_2 = L_x$$

$$I_z \ddot{\theta}_2 + [(I_y - I_x)\omega_0^2 + H\omega_0]\theta_2$$

$$- [(I_{\underline{x}} + I_z - I_y)\omega_0 + H]\dot{\theta}_1 = L_z$$

where $I_z$, $I_y$ and $I_{\underline{x}}$ column 4, line 2, for "th" read -- the --; line 30, for "agular" read -- angular --; same column 4, lines 41 and 42, for "response" read -- responsive --.

Signed and sealed this 12th day of May 1964.

(SEAL)
Attest:

ERNEST W. SWIDER                                              EDWARD J. BRENNER

Attesting Officer                                        Commissioner of Patents